(12) United States Patent
Lindemann et al.

(10) Patent No.: US 11,453,025 B2
(45) Date of Patent: Sep. 27, 2022

(54) IN-LINE, COATED, BIAXIALLY ORIENTED POLYPROPYLENE FILM AND METHOD FOR THE PRODUCTION THEREOF

(71) Applicant: BRÜCKNER MASCHINENBAU GMBH & CO. KG, Siegsdorf (DE)

(72) Inventors: Willi Lindemann, Bad Reichenhall (DE); Martin Wolf, Traunstein (DE)

(73) Assignee: Brückner Maschinenbau GmbH & Co. KG, Siegsdorf (DE)

(*) Notice: Subject to any disclaimer, the term of this patent is extended or adjusted under 35 U.S.C. 154(b) by 258 days.

(21) Appl. No.: 16/753,134

(22) PCT Filed: Jan. 24, 2019

(86) PCT No.: PCT/EP2019/051783
§ 371 (c)(1),
(2) Date: Apr. 2, 2020

(87) PCT Pub. No.: WO2019/145442
PCT Pub. Date: Aug. 1, 2019

(65) Prior Publication Data
US 2020/0254475 A1   Aug. 13, 2020

(30) Foreign Application Priority Data
Jan. 26, 2018 (DE) .................... 10 2018 101 747.2

(51) Int. Cl.
*B05C 1/08* (2006.01)
*B32B 27/08* (2006.01)
*B32B 27/32* (2006.01)

(52) U.S. Cl.
CPC ............ *B05C 1/0826* (2013.01); *B32B 27/08* (2013.01); *B32B 27/32* (2013.01); *B32B 2255/10* (2013.01);
(Continued)

(58) Field of Classification Search
CPC ....... B32B 27/32–27/327; B32B 27/40; B32B 2264/1021; Y10T 428/31587
See application file for complete search history.

(56) References Cited

U.S. PATENT DOCUMENTS

2009/0226711 A1   9/2009  Silvi et al.
2014/0105523 A1*  4/2014  Bazbaz ............. B65D 33/2583
                                                    383/210

FOREIGN PATENT DOCUMENTS

CN   1151713 A   6/1997
CN   1813002 A   8/2006
(Continued)

OTHER PUBLICATIONS

Machine translation of CN107351497. Retrieved Mar. 9, 2022.*
(Continued)

*Primary Examiner* — Prashant J Khatri
(74) *Attorney, Agent, or Firm* — Nixon & Vanderhye P.C.

(57) ABSTRACT

The invention relates to a biaxially oriented polypropylene film (BOPP) comprising layers (A) to (D), wherein layers (B) to (D) contain biaxially oriented polypropylene and layer (A) contains polyurethane and nanoparticles and has a layer thickness of 25 to 300 nm, layer (B) contains polymers with functional groups that are capable of forming covalent bonds with polyurethane and is directly connected to layer (A), layer (C) has at least a layer thickness of 50% of the total thickness of the film, and layer (D) represents an outer layer of the film containing an anti-blocking agent. The invention also relates to a method for producing films of this type.

18 Claims, 3 Drawing Sheets

(52) U.S. Cl.
CPC ..... *B32B 2255/20* (2013.01); *B32B 2255/205* (2013.01); *B32B 2255/26* (2013.01); *B32B 2307/518* (2013.01); *B32B 2307/7244* (2013.01); *B32B 2307/7246* (2013.01); *B32B 2439/70* (2013.01)

(56) References Cited

FOREIGN PATENT DOCUMENTS

| | | | |
|---|---|---|---|
| CN | 101374658 A | | 2/2009 |
| CN | 101421050 A | | 4/2009 |
| CN | 101959681 A | | 1/2011 |
| CN | 103608178 A | | 2/2014 |
| CN | 106003939 A | | 10/2016 |
| CN | 106671532 A | * | 5/2017 |
| CN | 107351497 A | * | 11/2017 |
| DE | 196 22 083 | | 12/1997 |
| DE | 10 2005 020 913 | | 8/2006 |
| EP | 1 880 844 | | 1/2008 |
| EP | 2067833 A1 | | 6/2009 |
| KR | 101797390 B1 | | 11/2017 |
| WO | 2013/041469 | | 3/2013 |
| WO | 2017/202827 | | 11/2017 |

OTHER PUBLICATIONS

Machine translation of CN 106671532. Retrieved Mar. 9, 2022.*
International Search Report for PCT/EP2019/051783 dated Mar. 28, 2019, 4 pages.
International Preliminary Report on Patentability issued in PCT/EP2019/051783 dated Jul. 28, 2020.

* cited by examiner

IN-LINE, COATED, BIAXIALLY ORIENTED POLYPROPYLENE FILM AND METHOD FOR THE PRODUCTION THEREOF

This application is the U.S. national phase of International Application No. PCT/EP2019/051783 filed Jan. 24, 2019 which designated the U.S. and claims priority to DE Patent Application No. 10 2018 101 747.2 filed Jan. 26, 2018, the entire contents of each of which are hereby incorporated by reference.

INTRODUCTION

The invention relates to a biaxially oriented polypropylene film (BOPP) comprising layers (A) to (D), wherein layers (B) to (D) contain biaxially oriented polypropylene and layer (A) contains polyurethane and nanoparticles and has a layer thickness of 25 to 300 nm, layer (B) contains polymers with functional groups that are capable of forming covalent bonds with polyurethane and is directly connected to layer (A), layer (C) has at least a layer thickness of 50% of the total thickness of the film, and layer (D) represents an outer layer of the film containing an anti-blocking agent. The invention also relates to a method for producing films of this type.

PRIOR ART

Plastics material films comprising or consisting of biaxially oriented polypropylene (BOPP films, also known as biaxially stretched polypropylene films) have long been known, and are used for a wide range of application purposes. In particular, they play an important role as cost-effective materials for packaging foodstuffs. BOPP films and methods for the production thereof are described in DE 196 22 083 A1, for example. Column 1 of this document describes a general method for producing BOPP films. Mechanical properties, transparency, barrier properties and the like are often important properties in the use of polypropylene films of this type. For packaging air-sensitive and/or water-sensitive articles such as foodstuffs, medicines and the like, the good barrier properties of polypropylene, in particular against oxygen and water, are important advantages of films of this type. Good barrier properties lead to a longer shelf life of the packaged air-sensitive and/or water-sensitive articles. This applies in particular to foodstuffs. For many foodstuffs, part of the quality assurance from the plastics material film of the packaging is protection against flavour losses and prevention of the escape of odour-intensive substances, as well as, in many cases, protection against atmospheric oxygen and/or atmospheric humidity and/or humidity losses from the product. Films having properties of this type are also referred to as barrier films or barrier layer films. To improve the barrier properties, a wide range of measures have been applied, such as monoaxial or biaxial orientation of the polypropylene films (MOPP or BOPP films) and the use of coatings that increase the barrier properties, in particular including coating with metals and metal oxides or polymers other than polypropylene.

However, in films, in addition to the usage properties, particular properties that make cost-effective production possible are also required. These include first and foremost the composition of the surfaces, which on the one hand have to be smooth enough to enable closed coating by metallisation and the like, but on the other hand have to have sufficient surface roughness to produce sufficient friction for processing on rolls and so forth. Otherwise, production of the films by the usual high-efficiency production routes with high advance rates would not be possible. To ensure that the films are printable, the film surface also has to have particular properties, including a suitable surface tension.

High-strength films having excellent barrier properties are known from DE 10 2005 020 913 B3. The advantageous barrier properties and surface properties are attributable to an additional polyamide-containing layer, which is coextruded. However, these films are relatively expensive to produce and the material costs for the polyamide are high, partly because it is used in large amounts. Further, first and foremost, the surface composition of the polyamide layer could be improved so as to achieve better adhesion of the metal or metal oxide layer when a metal or metal oxide layer is applied and to improve processability.

OBJECT OF THE INVENTION

Therefore, an object of the invention was to provide a film that has advantageous barrier properties, in particular advantageous barrier properties against oxygen and water vapour. A further object is to provide a BOPP film that can be produced in a simple manner and at low expense. Moreover, a film that has favourable surface properties is to be provided. The film should in particular favour rapid processing. It is likewise an object of the invention to provide a film that enables improved adhesion of metal or metal oxide layers. Preferably, the BOPP film can be produced cost-effectively.

DESCRIPTION OF THE INVENTION

Figure 1:
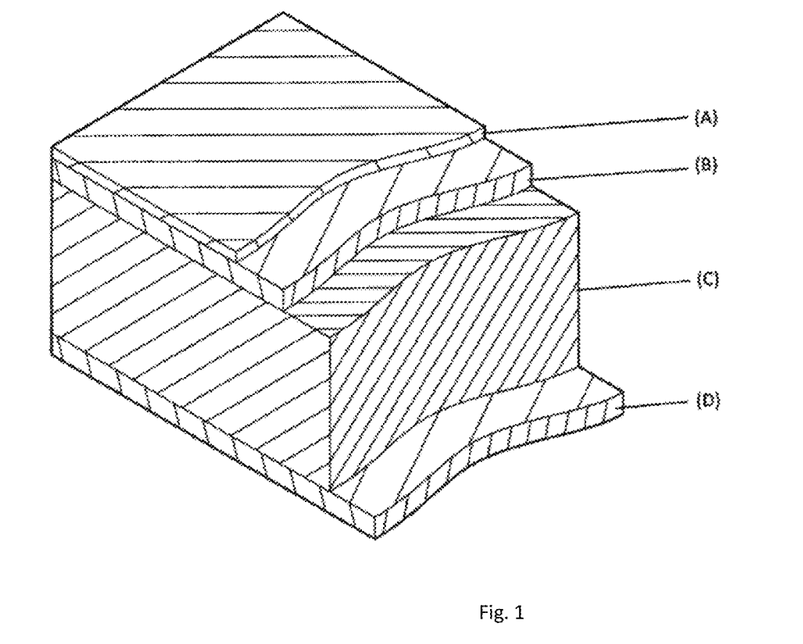
FIG. 1 shows the construction of the films according to the invention having layers (A) to (D).

One subject matter of the invention is a polypropylene film comprising 4 layers (A) to (D), which are arranged in order from (A) to (D) (see FIGS. 1 and 2B), wherein layers (B) to (D) comprise biaxially oriented polypropylene and wherein layer (A) contains polyurethane and nanoparticles and has a layer thickness of 25 to 300 nm, layer (B) contains polymers with functional groups that are capable of forming covalent bonds with polyurethane and is directly connected to layer (A), layer (C) has at least a layer thickness of 50% of the total thickness of the film, and layer (D) represents an outer layer of the film and comprises an anti-blocking agent.

As well as good mechanical properties, films of this type also have improved barrier properties and improved surface properties. In particular, they form very strong connections with metal or metal oxide layers applied to layer (A). Where reference is made to metal layers hereinafter, metal oxide layers are always included unless specified otherwise or unless something to the contrary is implied by the context.

Figure 2A:
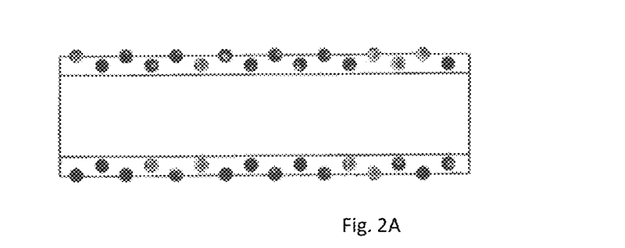
FIG. 2A shows the construction of a conventional polypropylene film having a carrier layer and two outer layers (skin layers), one of which contains anti-blocking agent.
Figure 2B:
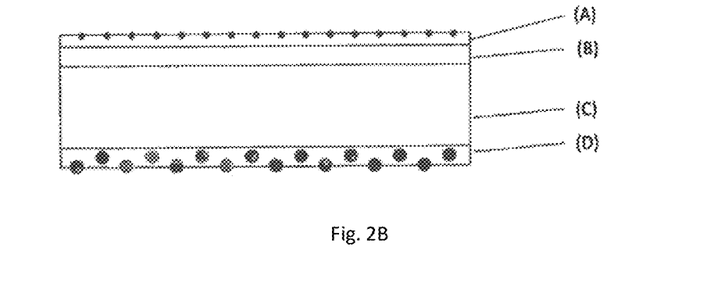
FIG. 2B shows the construction of a film according to the invention, having the additional layer (A) containing nanoparticles. The particles in the layers are marked.

FIGS. 2A and 2B show a comparison between a conventional biaxially oriented polypropylene film having a carrier layer in the centre and an outer layer (skin layer) on each of the two surfaces (FIG. 2A) and a film according to the invention (FIG. 2B). In the conventional film of FIG. 2A, the central layer is the primary or carrier layer. It is the layer that gives the whole film the mechanical and barrier properties thereof. The two outer layers generally consist of similar material to the carrier layer, and additionally contain anti-blocking agents (not shown for the lowermost layer). Anti-blocking agents are agents that give the surface of the film increased roughness. When the film is rolled up, this roughness prevents excessively strong adhesion of the front face and rear face to one another, and this subsequently facilitates unwinding. In general, these are solid particles having a size in the micrometre range, preferably being 1 to 10 μm and particularly preferably 1.5 to 4 μm. The anti-blocking agents are generally used exclusively in the outer layers so that they do not negatively influence the properties of the carrier layer.

In the film according to the invention of FIG. 2B, layers (C) and (D) correspond to the carrier layer and the lower outer layer of the conventional film. Layers (A) and (B) replace the upper outer layer. The material of layer (A) (polyurethane) gives the polypropylene film according to the invention improved barrier properties. Moreover, the polyurethane surface is extremely smooth (has a very low surface roughness) and has a greatly increased surface tension. If a metal layer is additionally applied thereto so as further to increase the barrier properties, it therefore adheres extremely strongly to the polyurethane surface. The adhesion of layer (A) to layer (B) is also extremely strong. The printability of layer (A) is likewise outstanding.

Layer (A) therefore additionally acts as a primer for the metallisation and printing. Therefore, layer (A) is an outer layer of the film if the film is not provided with a metal or metal oxide layer.

The nanoparticles give layer (A) sufficient surface roughness in spite of a high smoothness. Surprisingly, replacing the anti-blocking particles with nanoparticles leads to the barrier properties of metal layers of this type being improved. On the one hand, this could be because the surface roughness is lower than in conventional films that have anti-blocking agents in the layer at the surface of the film. Thus, more uniform coating can be achieved. On the other hand, however, the barrier properties of wound-up metallised films are also improved. Industrial films are stored, and provided for further processing, in the form of rolls. During rolling-up, the upper and lower face of the film come into contact with one another. Thus, in a film coated with metal on one face, the metal layer comes into contact with the other face of the film. In the conventional BOPP film of FIG. 2A, the metal layer thus comes into contact with anti-blocking agents directly from both sides in the wound-up state. At points where the large particles of the anti-blocking agents are directly opposite one another on both faces of the film, a higher pressure is exerted on the film at this location, and this can lead to holes (for example pinholes), tears and other defects in the metal layer and reduces the barrier properties thereof. In the film according to the invention, the particles of the anti-blocking agents encounter the much smaller nanoparticles. This reduces the locally exerted pressure and reduces the number of defects and in particular pinholes in the metal layer. This effect also occurs if layer (D) does not comprise anti-blocking agents. The barrier properties are improved in this case too, since the smaller nanoparticles produce fewer defects at the metal or metal oxide coating than conventional anti-blocking agents.

The high smoothness of the polyurethane surface, the high surface tension thereof, and also the polyurethane material itself bring about strong adhesion of the lower and upper face to one another in the event of winding up into rolls. In the event of unrolling at the usually high processing speeds, this can lead to irregularities in the movement sequence, and this can bring about high forces on the film. This can lead to damage to the barrier layers. However, the nanoparticles bring about the formation of an air layer between the surfaces, and thus enable unproblematic unwinding of the films even at high speed.

The term "polypropylene" refers to a polypropylene that is orientable or already oriented by biaxial stretching. It includes isotactic polypropylene. Preferably, this has a high level of isotacticity. The isotacticity is preferably in the range of more than 70%, particularly preferably in the range of more than 85% and most preferably in the range of 92 to 96%. This is preferably a polypropylene homopolymer. However, other polypropylene types used for comparable purposes may also be used, for example those which contain a number of copolymerised other monomers. In these cases, in polypropylenes according to the invention, typically at least 70%, preferably at least 80% and particularly preferably at least 90% and more particularly preferably 95% and most preferably at least 98% of the monomers are propylene. Thus, for example, polymers that contain up to 2% by weight monomers of other alpha-olefins as well as propylene are suitable. Mixtures (blends) of a polypropylene, in particular of a polypropylene homopolymer with other polymers, are likewise suitable. These other polymers may for example be selected from the group consisting of olefin polymers, olefin copolymers or olefin terpolymers. Of these, ethylene propylene copolymers are preferred.

Preferably, the proportion of polypropylene homopolymers in the polypropylene in the invention is higher than 50%, particularly preferably higher than 80% by weight, more particularly preferably higher than 90% and most preferably higher than 95%.

Unless specified otherwise, it is further preferred for layers (B) to (D) each to contain at least 35% by weight polypropylene, particularly preferably at least 50% by weight polypropylene, more particularly preferably at least 75% by weight polypropylene and most preferably at least 90% by weight polypropylene, in each case based on the total mass of the layer. However, layers (B) to (D) may also comprise non-isotactic polypropylene or polymers other than polypropylene, as long as the layers or the materials for producing them are still orientable as a whole.

The weight-average molecular weight of the polypropylene is preferably in the range of 150,000 g/mol to 500,000 g/mol, particularly preferably in the range of 200,000 g/mol to 480,000 g/mol and more particularly preferably in the range of 250,000 g/mol to 450,000 g/mol.

The crystallinity of the polypropylene is preferably at least 20%, particularly preferably at least 25% and more particularly preferably at least 45%, in each case as measured by differential scanning calorimetry (DSC). The crystallinity of the polypropylene is also preferably in the range of 30 to 70% as measured by differential scanning calorimetry (DSC).

Layers (B) to (D) of the film according to the invention form a biaxially oriented polypropylene film. The longitudinal direction is the direction in which the film was originally extruded (machine direction), and is generally abbreviated to "MD". The transverse direction is perpendicular thereto and is generally also abbreviated to "TD". The thickness is the third dimension. Biaxially oriented polypropylene films have excellent mechanical properties and good barrier properties.

The thickness of the film according to the invention is usually in the range of 3 to 50 μm, preferably in the range of 5 to 30 μm, particularly preferably in the range of 5 to 20 μm. Films having low thicknesses are cost-effective and simple. If the thickness is too low, the mechanical properties and thus also the processability are insufficient. If the thickness is too high, the processability during production and further processing is also insufficient.

Layer (A)

The film according to the invention is characterised in that it has a polyurethane layer, i.e. layer (A). The polyurethane layer (A) has a strong diffusion-inhibiting effect, which contributes to a major improvement in the oxygen barrier properties and the water vapour barrier properties of the whole film. In addition, layer (A) serves first and foremost to enable highly durable coating of the film according to the invention with metals and metal oxides.

Layer (A) has a favourable and precisely settable surface roughness, which is attributable both to the very smooth surface of layer (A) and to the nanoparticles in layer (A). The very smooth surface of layer (A) enables a very strongly adhering coating for metals such as aluminium or for metal oxides such as aluminium oxide or silicon dioxide. Because of the small size of the nanoparticles, they do not impede a strong bond between the metal or metal oxide layer (M) and the layer (A). Furthermore, the nanoparticles cause fewer defects in the metal or metal oxide layer. On the other hand, the nanoparticles give the surface of layer (A) sufficient surface roughness and thus produce a friction that makes it possible to transport the film through rolls effectively in the production process and to wind and unwind it. Layer (A) further has a very high and very homogeneously distributed surface tension and, because of its chemical constitution, is much better suited for subsequent coating with metals or metal oxides than polypropylene layers, and this also greatly improves the adhesion of metal or metal oxide layers (M) applied thereto. This applies in particular to metal layers (M) of aluminium on the surface of layer (A). The penetration depth of evaporation-deposited aluminium atoms is much higher than for the uncoated film (without layer (A)).

Furthermore, a surface treatment downstream from the production process and in particular from the stretch process (for example corona, plasma or flame treatment) is no longer required. This treatment is normally compulsory for a BOPP film having a polypropylene outer layer so as to enable coating with metals or metal oxides. In this context, functional groups are produced on the non-polar surface of the polypropylene, increasing the surface tension and improving the adhesion. Generally, this takes place between stretching and winding up the film. The effect subsides after some amount of time, and may then need to be refreshed before further processing. This means that the surface tension decreases below a threshold after a few weeks of storage and has to be renewed again. This is not required for the film according to the invention, since the in-line coating with polyurethane provides for a long-term increase in the surface tension by comparison with the normal surface treatment, which may for example be corona, plasma or flame treatment, and does not have to be refreshed. This is a major commercial advantage of the present films, since they have a long storage life. Not only is this very positive for the process, but it also leads to a large time saving.

Layer (A) has a layer thickness in the range of 25 to 300 nm, this preferably being in the range of 50 to 200 nm and particularly preferably in the range of 50 to 150 nm. Most preferably, layer A has a layer thickness in the range of 100 to 150 nm. At the same time, layer (A) preferably has a layer thickness in the range of 0.1 to 5%, preferably in the range of 0.2 to 3% and particularly preferably in the range of 0.5 to 1% of the thickness of the film according to the invention. Polyurethane is relatively expensive by comparison with polypropylene. A low layer thickness therefore leads to lower costs. However, if the layer is smaller than specified here, the formation of a homogeneous layer (A) on the film becomes difficult. Moreover, the layer (A) gradually loses its barrier properties. By contrast, a high layer thickness leads to higher costs, but also to better barrier properties. However, very high thicknesses can no longer be applied in an in-line process (see below) and therefore increase the costs disproportionately.

As the material for the polyurethane, conventional commercial polyurethane dispersions are suitable. Takelac WPB 341 is particularly suitable. This is an aqueous dispersion from Mitsui Chemicals having a 30% polyurethane content. Layer (A) may in principle also be applied by other process, but in some cases loses the advantages of being very thin, having a very uniform thickness and being very smooth as a result. Production of the layer by in-line coating is then also no longer possible in some cases. However, this simple production process constitutes a major advantage of the invention (see below).

The nanoparticles of layer (A) preferably include nanoparticles of amorphous silicon dioxide. Particularly preferably, the nanoparticles include nanoparticles of colloidal silicon dioxide. However, other nanoparticles are also suitable. Preferably, the particles are used in colloidal form as dispersions. Nanoparticles that are added to the polyurethane in a dry form have a stronger tendency to agglomeration and sedimentation than colloidal dispersions. This is undesirable. Spherical particles are preferably used. The average particle size of the nanoparticles of the layer (A) as determined by laser diffraction particle size analysis is preferably not greater or only up to 20% greater than the thickness of layer (A). Larger particles, such as anti-blocking particles, would protrude too far from the layer and in some cases cause defects and in particular pinholes in a potentially applied metal layer or metal oxide layer (M), detracting from the barrier properties. The average particle size of the nanoparticles in layer (A) is preferably in the range of 20 to 150 nm, particularly preferably in the range of 80 to 150 nm. If the nanoparticles were too small, they would have no effect and the film would be too smooth. Processing would not be possible, or not to a sufficient extent. If the nanoparticles were too large, the nanoparticles could protrude too far above layer A and thus detract from any coating with metals or metal oxides. The films would become water-permeable and air-permeable.

Further, the nanoparticles in layer (A) preferably have a BET specific surface area in the range of 10 to 500 $m^2/g$, particularly preferably in the range of 10 to 150 $m^2/g$, more particularly preferably in the range of 10 to 100 $m^2/g$ and most preferably in the range of 20 to 70 $m^2/g$. This enables good bonding of the nanoparticles to the polyurethane. Nanoparticles of the Levasil 30/50 type from Akzonobel are particularly suitable. This is a dispersion of colloidal silicon dioxide in water.

The nanoparticles are contained in the layer (A) preferably in an amount in the range of 0.5 to 20% by weight, particularly preferably in the range of 1 to 10% by weight and more particularly preferably in the range of 2 to 7% by weight. The amount of nanoparticles makes it possible to adapt the surface roughness. This leads to particularly good adhesion of metal layers or metal oxide layers (M) on the layer (A) and facilitates winding and unwinding the film from rolls at high processing speeds.

Layer (B)

To improve the bonding of the polyurethane layer (A) to the film, layer (B), which is a type of adhesive layer, comprises polymers having functional groups that can form covalent bonds with polyurethane. The functional groups act as adhesion promoters. If layer B contains no or insufficient functional groups, layer A does not remain adhering to layer B and the film becomes unstable. These polymers may be polypropylene or other polymers. However, layer (B) contains polypropylene in every case. Preferably, however, the polymers are polyolefins. The polyolefins may for example be selected from the group consisting of polyethylene, polypropylene, the latter being preferred. The use of polypropylene leads to layers (B), (C) and (D) having similar properties during processing. Polypropylenes are to be understood to be polymers selected from the group consisting of propylene homopolymers, propylene copolymers and propylene terpolymers.

The polypropylene of layer (B) is preferably a propylene homopolymer, propylene copolymer or propylene terpolymer. These may additionally have the functional groups. Propylene copolymers and propylene terpolymers for use in layer (B) preferably contain at least 50% by weight propylene monomers, preferably in the range of 80-98% by weight. In addition, they preferably contain ethylene and/or butylene monomers.

The functional groups are preferably selected from the group consisting of carboxylic acid hydride groups, epoxy groups, carboxylic acid groups and carboxylic acid ester groups. The polymers of layer (B) may also comprise a plurality of different functional groups of this type, for example carboxylic acid anhydride groups and carboxylic acid ester groups. Particularly preferably, the polymers of layer (B) include carboxylic acid anhydride groups. More particularly preferably, the polymers of layer (B) include maleic acid anhydride groups. Most preferably, layer (B) comprises a maleic-acid-anhydride-modified polypropylene. In particular, this is a polypropylene having grafted-on maleic acid anhydride groups, and most preferably a polypropylene homopolymer having grafted-on maleic acid anhydride groups. Maleic acid anhydride groups lead to particularly strong bonds between layer (A) and layer (B). It is likewise preferred for layer (B) not additionally to contain any further polymers. A large amount of polypropylene ensures that the layer has similar mechanical properties and similar expansion properties to layers (C) and (D). A large amount of maleic-acid-anhydride-modified polymer contributes particularly strongly to the bond between layers (A) and (B). The degree of grafting of the polypropylene homopolymer having grafted-on maleic acid anhydride groups is preferably in the range of 0.01 to 1%, particularly preferably in the range of 0.1 to 0.4%.

The maleic acid anhydride groups may also be introduced by copolymerising copolymerisable derivatives of maleic acid anhydride, such as 2-vinyl-maleic acid anhydride, into the polypropylene. Layer (B) may also comprise polymer mixtures (blends) of the above-mentioned polymers and further polymers.

Modified polypropylenes of this type are known, and are marketed for example by Matsui Chemicals as Admer®, by Mitsubishi Chemicals as Modic®, by Chemplex as Plexar®, by Eastman as Epilene®, and by DuPont as Bynel®. For the purposes of the invention, propylene homopolymers or propylene copolymers are preferred that are modified with maleic acid anhydride (for example Q-series products from Mitsui Chemicals), that have melt indices in the range of 1 to 10 g/10 min at 230° C. (ASTM D 1238), and that have Vicat softening points between 110 and 155° C. (ASTM D 1525). The production of polymers of this type is described for example in U.S. Pat. No. 3,480,580 A, for example in Examples 3, 4 and 6. The grafted-on maleic acid anhydride groups increase the polarity at the surface of layer (B) and enable chemical bonding to the constituents of the polyurethane layer (A).

More particularly preferably, the maleic acid anhydride modified polypropylene having trade name ADMER™ AT3177E (available from Mitsui Chemicals GmbH, Germany). As a result of the special composition of the material, it is usable on the surface and has a very high gloss. The resulting surface of the layer (B) is very well suited for coating with the layer (A) (in particular after MD stretching, see below) because of the low surface roughness and the increased surface tension, and brings about sufficient adhesion of layer (A) to layer (B).

It is likewise more particularly preferred for layer (B) not to contain anti-blocking agents. Anti-blocking agents could greatly increase the surface roughness of layer (B) and worsen the bonding of the polyurethane layer. First and foremost, however, anti-blocking agents of this type can bring about irregularities in the surface of the very thin layer (A), and thus also cause defects and in particular pinholes in a metal layer or metal oxide layer potentially applied thereto. The barrier properties against oxygen and/or water vapour can be worsened as a result.

The thickness of layer (B) is generally in the range of 0.3-5 μm, preferably in the range of 0.3-3 μm, in particular in the range of 0.5 to 2 μm. It is preferred for layer (B) to have at most a layer thickness of 25% and preferably at most 15% of the thickness of the film.

Layer (C)

Layer (C) is the primary layer (also known as the base layer or support layer). It is first and foremost decisive as to the mechanical properties of the film according to the invention. However, as a result of the biaxial orientation of this layer and the layer thickness, it also contributes greatly to the barrier properties and optical properties.

Preferably, layer (C) has at least a layer thickness of 50%, preferably at least 70% and particularly preferably at least 80% of the thickness of the film. In particular, the thickness of layer (C) is preferably in the range of 3 μm to 45 μm, particularly preferably in the range of 5 μm to 28 μm and most preferably in the range of 7 μm to 20 μm.

Films of this type have long been known to the person skilled in the art. Preferably, layer (C) comprises a polypropylene homopolymer. It is further preferred for layer (C) to comprise more than 50% by weight, preferably more than 80% by weight and particularly preferably more than 90% by weight polypropylene. Most preferably, it consists of polypropylene homopolymer.

Layer (D)

Layer (D) serves to give the face of the film remote from layer (A) a favourable surface composition and in particular sufficient surface roughness for the film according to the invention to be able to be transported over rolls and unwound from rolls at high speeds. This is therefore a conventional skin layer of polypropylene films. Preferably, layer (D) contains a polypropylene homopolymer. However, the layer may also contain a polypropylene copolymer.

The amount of anti-blocking agent contained in layer (D) is generally in the range of 1 to 10% by weight, preferably in the range of 1 to 7% by weight and particularly preferably in the range of 1 to 6% by weight. At excessively low amounts, the surface is too smooth and the film cannot be processed well, and in particular cannot be wound up and unwound again well. If the amount is too great, too many particles protrude from the surface of the film. If a film coated with metal on the opposite face is subsequently wound up, these particles come into contact with the metal layer. They can then press into the metal layer (or metal oxide layer) and cause defects, and in particular pinholes, that reduce the barrier properties. Therefore, an amount should be used that is as low as possible while still enabling processing. A suitable amount can be determined for any film in a simple manner using preliminary tests. All known anti-blocking agents may be used.

The film according to the invention may have further layers, which may be positioned between layer (C) and layers (B) and (D).

Moreover, all layers, depending on the intended application purpose of the film, may contain various conventional additives, which may for example be selected from the group consisting of mineral or organic additives for forming microcavities, fillers, absorbents, UV-protection and light-protection agents, colourants and opaque pigments.

For use in or as foodstuff packagings, polypropylene films are often provided with a metal layer or metal oxide layer at least on one face. Therefore, a film according to the invention that has a metal layer or metal oxide layer that is directly connected to the surface of layer (A) is also a subject matter of the present invention. Films of this type may be used directly for foodstuff packagings.

A conventional commercial BOPP film having a thickness of 18 µm, which merely has layers (B), (C) and (D) in this order, has a permeability to oxygen (oxygen transmission rate, OTR) of approximately 1500 $cm^3/m^2*d$. Through standard metallisation, this value can be reduced to approximately 60-80 $cm^3/m^2*d*bar$. By comparison with these benchmark films, the OTR of the metallised film according to the invention can be cost-effectively reduced to 6-7 $cm^3/m^2*d$ by the measures according to the invention (see also Table 1 and FIG. 3). In other words, the use of a coating (layer (A)) that is only 100 nm thick reduces the oxygen permeability of the BOPP films according to the invention by approximately a factor of 10 by comparison with currently available BOPP films. The invention thus closes a gap between a conventional metallised BOPP film having worse barrier properties and the ultra-high barrier films, which are very costly and expensive to produce, which achieve values of 0.3 $cm^3/m^2*d$ or less but are very costly. The same applies to the permeability to water vapour (water vapour transmission rate).

Films according to the invention that have an oxygen permeability in the range of 1 to 10 $cm^3/m^2*d$ are preferred. Further, films according to the invention that have a permeability to water vapour of 0.1 to 0.5 $g/m^2 d$ are preferred.

Methods for metallising plastics material films are known to a person skilled in the art. They may in principle take place by vacuum metallisation, indirect metallisation, for example by hot film embossing, plating and painting. Vacuum metallisation is preferred, since it does not require any particular properties of preparations of the films and necessitates no or almost no auxiliary materials. Vacuum metallisation may be carried out either by standard vacuum metallisation (physical vapour deposition) or by sputtering (plasma-enhanced chemical vapour deposition, PE-CVD). If aluminium is used, standard vacuum metallisation is advantageously applied. Metal oxide layers may likewise be applied by known methods. If the film according to the invention has a metal oxide layer, it is preferably an aluminium oxide layer or a silicon dioxide layer that is directly connected to the surface of layer (A). The thickness of the layers varies depending on the material. For aluminium layers, layer thickness in the range of 30 to 80 nm are preferred. Layer thicknesses of 30 to 80 nm are preferred for silicon dioxide layers, and 5 to 20 nm for aluminium oxide layers.

A further aspect of the present invention is a foodstuff packaging comprising a film according to the invention.

A further aspect of the present invention is a method for producing a film according to the invention, comprising the steps of:
 providing a sheet that is monoaxially stretched in the longitudinal direction and comprises layers (B) to (D) having a composition as described above, wherein layers (B) and (D) are outer layers of the sheet,
 applying a layer of a liquid dispersion containing polyurethane and nanoparticles to layer (B),
 drying the liquid dispersion to produce layer (A),
 stretching the sheet in the transverse direction to produce a biaxially oriented film.

This method therefore comprises sequential stretching. Preferably, for producing a film according to the invention, this method comprises the steps of:
 providing at least the polymers for layers (B), (C) and (D), having a composition as described above, with all of the constituent ingredients,
 melting the individual polymers,
 extruding the polymers from a slot die to produce a sheet having at least three layers corresponding to layers (B), (C) and (D), layers (B) and (D) being outer layers of the sheet,
 cooling the resulting sheet on a cooling roll to produce a sheet having layers (B), (C) and (D),
 stretching the sheet in the longitudinal direction,
 applying a homogeneous layer of a liquid dispersion containing at least polyurethane and nanoparticles to layer (B),
 drying the liquid dispersion by heating to produce layer (A),
 stretching the sheet in the transverse direction to produce a biaxially oriented film.

In this method, the polymers that are provided are generally non-oriented.

In a conventional method for producing biaxially oriented polypropylene films, a polypropylene starting material is provided and melted, and a cast sheet (primary sheet) is produced from the melt by extruding and cooling the melt. Subsequently, the cast sheet is brought to the stretching temperature by reheating, and stretched biaxially in the machine direction (MD) and transverse direction (TD), specifically either sequentially or simultaneously, and the stretched biaxially oriented polypropylene film is wound up after cooling. In sequential stretching, the cast sheet is initially stretched in the machine direction (MD) and subsequently in the transverse direction (TD). In simultaneous stretching, the cast sheet is stretched in both directions simultaneously.

In the present description, biaxially oriented polypropylene films are referred to as films, while non-oriented or monoaxially oriented polypropylene sheets are referred to as sheets. However, this is not adhered to strictly. Within the meaning of the invention, the terms "sheet" and "film" are to be understood as synonyms that are used exchangeably in describing the invention.

By contrast with the conventional production method, here layer (A) is additionally applied. The application of the polyurethane in the form of a dispersion to the sheet, after the stretching in the longitudinal direction but before the stretching in the transverse direction, leads to a very simple method that hardly leads to any additional expense over the production process for conventional films. No additional extruder has to be used for the polyurethane layer. Since sheets are heated close to their softening point for stretching, the solvent can be removed automatically by evaporation if the sheet is heated for stretching in the transverse direction.

Since layer (A) is very thin, the time period required for evaporating the solvent is very short. Simultaneously, the nanoparticles, as a constituent ingredient of a liquid dispersion, are distributed through the liquid uniformly over the surface of layer (A). The polyurethane layer can therefore be applied in-line by coating, and the expense is very low.

However, the polyurethane dispersion may also be applied before a stretching process in the longitudinal direction, such as are described in the following methods, which are likewise according to the invention:

Method for producing a film according to the invention, comprising the steps of:
  providing a sheet comprising layers (B) to (D) with a composition as described above, in which layers (B) to (D) are non-oriented (primary sheet) and layers (B) and (D) are outer layers of the sheet,
  applying a liquid dispersion containing polyurethane and nanoparticles to layer (B),
  drying the liquid dispersion by heating to produce layer (A),
  simultaneously stretching the sheet in the longitudinal direction and transverse direction to produce a biaxially oriented film.

The above method for producing a film according to the invention comprising the following steps is preferred:
  providing at least the polymers for layers (B), (C) and (D), having a composition as described above, with all of the constituent ingredients,
  melting the individual polymers,
  extruding the polymers from a slot die to produce a film having at least three layers corresponding to layers (B), (C) and (D), layers (B) and (D) being outer layers of the sheet,
  cooling the resulting sheet on a cooling roll to produce a sheet having layers (B), (C) and (D),
  applying a liquid dispersion containing at least one polyurethane and nanoparticles to layer (B),
  drying the liquid dispersion by heating to produce layer (A),
  simultaneously stretching the sheet in the longitudinal direction and transverse direction to produce a biaxially oriented film.

In this method, the polymers that are provided are generally non-oriented. For melting and extruding the polymers, in each case for example single-screw extruders or twin-screw extruders may be used.

In a third version of the method according to the invention, a combination of the above methods according to the invention is used. In this context, the sheet is initially stretched in the longitudinal direction, subsequently the liquid dispersion is applied, and subsequently simultaneously stretching is carried out again.

However, the initially set-out method, in which sequential stretching is applied, is preferred, since less liquid dispersion has to be applied in this case than if stretching is carried out simultaneously. This speeds up the method and reduces the costs.

In addition to the nanoparticles and the polyurethane, the dispersion further contains a solvent. Preferably, the liquid dispersion contains 0.5 to 20% by weight, preferably 1 to 10% by weight and particularly preferably 2 to 7% by weight nanoparticles, based on the dry mass of the liquid dispersion. In this context, the dry mass is determined by drying the liquid dispersion at 130° C. until the weight stays constant. The residue then represents the dry mass. The solvents used for the liquid dispersion in this method therefore preferably have a boiling point of 140° C. or less, particularly preferably of 130° C. or less and more particularly preferably of 120° C. or less.

The liquid dispersion typically contains 80 to 99.5% by weight, preferably 90 to 99% by weight and particularly preferably 93 to 96% by weight polyurethane based on the dry mass of the liquid dispersion. In this context, as well as polyurethane, the dry mass at least further contains the nanoparticles and may additionally contain further auxiliary materials. Furthermore, the liquid dispersion typically contains 5 to 25% by weight, preferably 10 to 20% by weight and particularly preferably 12 to 18% by weight dry mass. Preferably, the liquid dispersion is an aqueous dispersion. Particularly preferably, water is the sole solvent used in the liquid dispersion. In addition, the dispersion may contain cross-lining agents. The cross-linking agents may make up amounts of up to 3% by weight, preferably up to 1% by weight of the dry mass of the dispersion. The cross-linking agent is preferably a polyfunctional aziridine cross-linking agent.

As polyurethane, the polyurethane dispersion Takelac WPB-341 from Mitsui Chemical is preferably used. This is a specially modified polyurethane, which has a greatly increased oxygen barrier by comparison with conventional polyurethanes. Thus far, the material was only used in the off-line coating sector to increase gas barriers of solar cells or special packagings. The material has never previously been used for the in-line process with subsequent stretching. It is further preferred for Levasil 30/50 nanoparticles from Akzonobel to be added in an amount of 3 to 5%.

A method according to the invention is preferred in which the liquid dispersion is dried simultaneously with stretching the sheet in the transverse direction or in which the liquid dispersion is dried simultaneously with preheating the sheets for the simultaneous stretching of the sheets in the longitudinal and transverse directions. For stretching, polypropylene sheets are usually heated to 120° C. or more in the preheating zone of the stretching oven, so as to bring the sheet to stretching temperature so as to increase the expandability thereof. By heating the sheet in the preheating zone, the dispersion located thereon can simultaneously be dried, forming layer (A). An additional method step for drying the dispersion is therefore superfluous.

Figure 4:
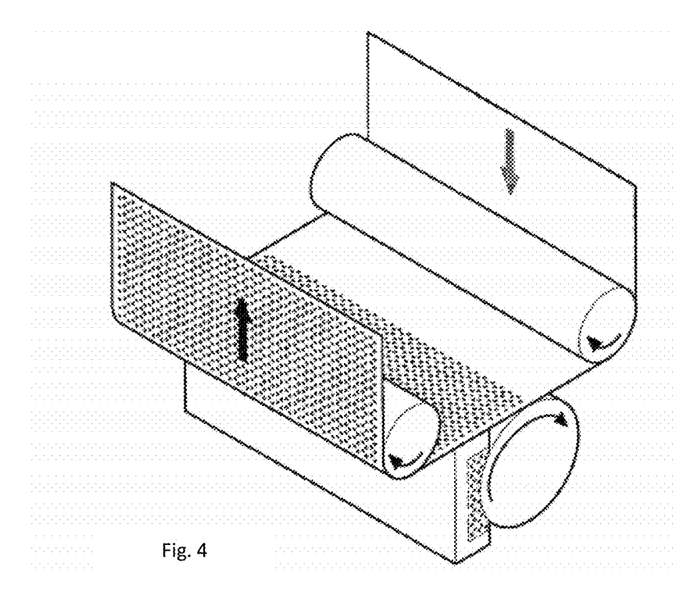
FIG. 4 is a schematic representation of a reverse gravure kiss coating process such as is used in the present method. The dotted regions on the film show the part of the film coated on one face. Further, the liquid dispersion in the reservoir is shown dotted.

The liquid dispersion is preferably applied to layer (B) by reverse gravure kiss coating, and particularly preferably by kiss coating using a reverse gravure coater. FIG. 4 schematically shows how this method is carried out. The sheet is passed over the gravure roll, which rotates counter to the movement direction of the sheet, by two guide rolls. The printer roll is loaded with the aqueous dispersion (dotted) by way of a reservoir. This method enables uniform application of the liquid dispersion at very high processing speeds. In this context, the solids proportion of the liquid dispersion preferably contributes 5 to 20% by weight, particularly preferably 10 to 20% by weight and ideally 15% by weight, in each case based on the total mass of the liquid dispersion. The wet layer formed by the liquid dispersion on layer (B) preferably has a mass of 3 to 20 g/m$^2$ and particularly preferably 6 to 10 g/m$^2$. More preferably, the solids proportion of the liquid dispersion is 10 to 20% by weight, and the wet layer formed therefrom has a mass of 6 to 10 g/m$^2$. When the liquid dispersion is applied, the liquid dispersion preferably has a temperature of not more than 100° C., preferably of not more than 70° C. and particularly preferably of not more than 40° C. The same preferably applies to the film. At high temperatures, the liquid may boil and/or the constituent ingredients may decompose. Usually, printing processes are carried out at room temperature, and maintaining this temperature should not be a problem. However, if the film is to be provided with layer A directly subsequent to production, care must be taken that it is cooled sufficiently before layer A is applied.

It is further preferred for the surface of layer (B) to be subjected to surface treatment before the liquid dispersion is applied. This surface treatment is preferably a surface treatment selected from the group consisting of corona treatment, plasma treatment and flame treatment. A corona treatment is most preferred. A surface treatment of this type of layer (B) improves the adhesion of layers (A) and (B) to one another. Since the degree of crystallisation of the sheet before the stretching in the transverse direction is still relatively low, the pre-treatment by corona treatment, plasma treatment and flame treatment is more effective than in conventional sheets, which are treated after the transverse stretching. The amount of the polyurethane dispersion is also several times lower in the case of application before the transverse stretching. Thus, for a sheet width of 1.5 m after the longitudinal stretching, the film width after the transverse stretching is typically 8-11 m. Therefore, a much greater amount of liquid dispersion would have to be applied so as to achieve uniform coating.

A method according to the invention characterised in that the cooling roll has a temperature in the range of 20 to 40° C. is likewise preferred. A conventional stretching oven that has at least one preheating zone is preferably used for the transverse stretching. In the present method, the preheating temperature in the preheating zone of the stretching oven has to be set in such a way that the polyurethane dispersion substantially dries before the actual stretching starts. For this purpose, the preheating temperature potentially has to be set higher than would usually be the case. Preferably, the preheating temperature is higher by 2 to 15° C. and particularly preferably by 3 to 10° C. If the liquid dispersion is not sufficiently dried before the stretching, layer (A) may have defects and in particular pinholes. If the surface tension is uniformly high over the entire surface of layer (A), a homogeneous coating is present. Accordingly, the oxygen permeability or water vapour permeability may also be used as a measure of sufficient drying. If longer drying or drying at a higher temperature no longer leads to an improvement in these values, the drying temperature is sufficient for this sheet and this production method.

It is further preferred for the stretching ratio in the longitudinal direction for sequential stretching to be in the range of 2 to 8, preferably in the range of 3 to 7 and particularly preferably in the range of 4 to 6. The stretching ratio in the transverse direction for sequential stretching is preferably in the range of 4 to 14, particularly preferably in the range of 6 to 10 and more particularly preferably in the range of 8 to 10. In the method using simultaneous stretching, the stretching rate is preferably 35 to 60, particularly preferably 40 to 55 and more particularly preferably 45 to 50. It is likewise advantageous for the application of the melt to the cooling roll to be assisted by an air knife.

Furthermore, after the stretching, relaxation in the longitudinal direction or the transverse direction or both directions can be performed on the film.

BRIEF DESCRIPTION OF THE DRAWINGS

FIG. 1.

FIG. 2A.

FIG. 2B.

FIG. 4.

EXAMPLES

Materials:

Takelac WPB 341 is an aqueous dispersion from Mitsui Chemicals having a 30% polyurethane content. Levasil 30/50 is an aqueous dispersion of colloidal silicon dioxide from Akzonobel having a colloidal silicon dioxide content of 50% by weight (particle size 80-100 nm; specific surface area 35 $m^2/g$; BET surface area 40 $m^2/g$). Admer AT 3177E is a polypropylene homopolymer having grafted-on maleic acid anhydride groups having a Vicat softening temperature of 135° C. (D1525). Moplen HP522 is an isotactic polypropylene homopolymer "Moplen®" HP 522 H from Basell having a Vicat softening temperature of 155° C. (ISO 306). Adsyl 3C30F is an isotactic polypropylene homopolymer from Basell having a Vicat softening temperature of 122° C. (ISO 306). POLYBATCH® ABVT22SC is an anti-blocking agent from Polybatch.

Particle sizes are preferably measured by laser diffraction particle size analysis.

Example 1

To produce a film according to the invention, Adsyl 3C30F and 5% by weight POLYBATCH® ABVT22SC based on the weight of the mixture were mixed. Admer AT 3177E for layer (B), Moplen HP522 for layer (C) and the aforementioned mixture for layer (D) were melted separately, in one extruder each, at 240 to 265° C. and extruded using a slot die. Layer C is extruded using a twin-screw extruder, and layers (B) and (D) are likewise each extruded using a twin-screw extruder. The melt extruded through the slot die is cooled using a cooling roll, and a cast sheet is thus obtained. This cast sheet is stretched in the longitudinal direction, with a stretching ratio of 5, in a stretching system at a sheet speed of 10 m/min. In this context, the preheating rolls have temperatures in the range of 80 to 104° C., the stretching rolls have temperatures in the range of 95 to 105° C., and the annealing rolls have temperatures in the range of 95 to 100° C. After stretching in the longitudinal direction, the sheet has a speed of 50 m/min. After the resulting monoaxially oriented sheet (MOPP sheet) is cooled, the surface of layer (B) of the sheet is initially subjected to a conventional corona treatment. This improves the wetting of the film surface with the polyurethane.

Subsequently, an aqueous polyurethane dispersion is applied to the MOPP sheet on layer (B) as a coating material by reverse gravure kiss coating, using a reverse gravure coater. For this purpose, engraved rolls are used, which have depressions that are filled with the dispersion on each rotation. In this context, the temperatures of the sheet and the polyurethane dispersion are lower than 100° C. During contact with the sheet web, part of the liquid is transferred to the sheet. An opposed rotation of the roll counter to the movement direction of the sheet results in a uniform wetting region on the sheet web. In this context, a 12 g/m² gravure roll is used, which produces a wet layer having 12 g aqueous dispersion per square metre sheet surface. The dispersion used for coating consists of 48% by weight Takelac WPB 341, 1.2% by weight Levasil 30/50 and 50.8% by weight water, each based on the total mass of the dispersion.

Subsequently, the sheet is stretched in the transverse direction, with a stretching ratio of 9, in a stretching oven, the preheating zone having a temperature in the range of 175 to 190° C. and the aqueous polyurethane dispersion thus being dried during the preheating in the stretching oven before the stretching to form a polyurethane layer (A). The stretching zones have temperatures of 160 to 170° C., and the annealing zone has a temperature in the range of 160 to 168° C. All temperatures set out herein are the temperature of the air in the corresponding zones of the stretching oven. Subsequently, the film is metallised in a further off-line method. Aluminium is used as the metal, and is applied by standard vacuum metallisation (PVD). The layer thickness is 45 nm, and the optical density of the layer is 2.7.

A film having the following properties is obtained:

Layer thicknesses: entire film 18.1 μm (according to DIN 53370), layer (A) 100 nm, layers (B) and (D) 1 μm, layer (C) 16 μm, metal layer (M) 45 nm; tear resistance (ASTM D 882) MD: 157 N/mm², TD: 291 N/mm²; elongation at break (ASTM D 882) MD: 250%, TD: 69%; modulus of elasticity (ASTM D 882) MD: 1231 N/mm², TD: 2475 N/mm²; coefficient of friction (DIN EN ISO 8295, U/U) MD: 0.58 μS, TD: 0.53 μk; heat shrink (BMS TT 0.2; 120° C./5 min) MD: 4%, TD 0.8%; oxygen permeability (ISO 15105-2) <7 cm³ (m²dbar) (at 23° C. and 0% relative air humidity); water permeability (ASTM E 96) 0.1 g/(m²d) (at 38° C. and 90% relative air humidity); metal adhesion (adhesive tape test, TP-104-87) 5/5, EAA sealing, AIMCAL Process TP-105-92 for the adhesion of metallised films, N/15 mm) >3, no stripping of the metal.

As can be seen from these values, the mechanical properties of the films according to the invention are similar to those of conventional commercial barrier films. However, the oxygen permeability and water permeability are greatly reduced. In use, this leads to an increased shelf life of foodstuffs packed using them.

Figure 3:
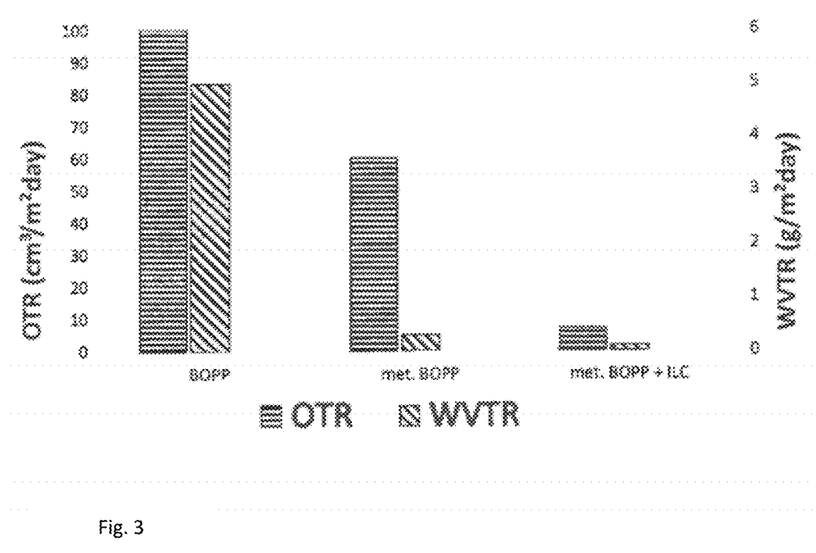
FIG. 3 FIG. 3 shows a comparison of the oxygen and water vapour barrier properties of conventional polypropylene films (BOPP), metallised BOPP films (met. BOPP) and films according to the invention having a polyurethane coating produced in-line and a metal layer produced off-line having particularly good barrier properties (met. BOPP+ILC). The entire left column is shown shortened (see Table 1).

FIG. 3 shows the oxygen permeability (OTR, oxygen transmission rate) and the permeability to water vapour (WVTR, water vapour transmission rate) for a metallised film according to Example 1 (met. BOPP+ILC, metallised biaxially oriented polypropylene film with in-line coating, far right), for a conventional commercial non-metallised biaxially oriented polypropylene film of the same thickness (BOPP, far left, the entire left column being show shortened (see Table 1; see also FIG. 2A for the schematic drawing of this film)) and for the same film with metallisation (met. BOPP, in the centre). As can be seen, by way of the film according to the invention, the oxygen permeability can again be dramatically reduced by comparison with the conventional commercial metallised BOPP film, without major additional expense being accrued during production. The oxygen permeability is reduced by almost a factor of 10. The permeability to water vapour is likewise heavily reduced.

Table 1 shows the numerical data for the films:

|  | Oxygen permeability [cm³/m² * day] | Permeability to water vapour [g/m² * day] |
|---|---|---|
| BOPP | 1500* | 5 |
| met. BOPP | 60 | 0.3 |
| met. BOPP + ILC | 7 | 0.1 |

*Shown shortened in FIG. 3

The metal adhesion is also extremely high and virtually unparalleled for a metallised biaxially oriented polypropylene film.

Example 2

This example is carried out in accordance with Example 1, but with the following modifications:

The film contains 6 layers with a layer construction A-B-$Z_1$-C-$Z_2$-D, $Z_1$ and $Z_2$ representing intermediate layers. Layer C is the base layer, and consists of polypropylene homopolymer from Repol (in Almassora, Castellon, Spain). Layers B, Z1, Z2 and D contain polypropylene copolymer. The materials for layers B, C, D, Z1 and Z2 are all extruded separately from one another using twin-screw extruders. The thicknesses of the layers are as follows: A: 100 nm, B: 0.77 μm, $Z_1$: 2.52 μm, C: 11.04 μm, $Z_2$: 2.53 μm, D: 1.18.

During the stretching in the longitudinal direction, the preheating rolls have temperatures in the range of 100 to 120° C., the stretching rolls have temperatures in the range of 65 to 75° C., and the annealing rolls have temperatures in the range of 120 to 130° C. During stretching in the transverse direction, the preheating zone has a temperature in the range of 180 to 160° C., the stretching zone has temperatures of 160 to 170° C., and the annealing zone has a temperature in the range of 160 to 170° C. The sheet speed upon leaving the slot die is 87 m/min. The sheet speed after stretching in the longitudinal direction is 400 m/min. When the polyurethane dispersion is applied, a 6 g/m² gravure roll is used, causing an approximately 6 μm thick liquid layer to be applied. During heating for the stretching in the transverse direction, this layer is dried, and the remaining layer thickness is 1 μm. Subsequently, the layer thickness is reduced further by the stretching.

The sheet width after the stretching in the longitudinal direction is 1100 mm. The width of the coating (the width of layer A) was 1000 mm.

The oxygen permeability of the film is 5 cm³/m²*day, and the permeability to water vapour is 0.1 g/m²*day.

Figure 5:
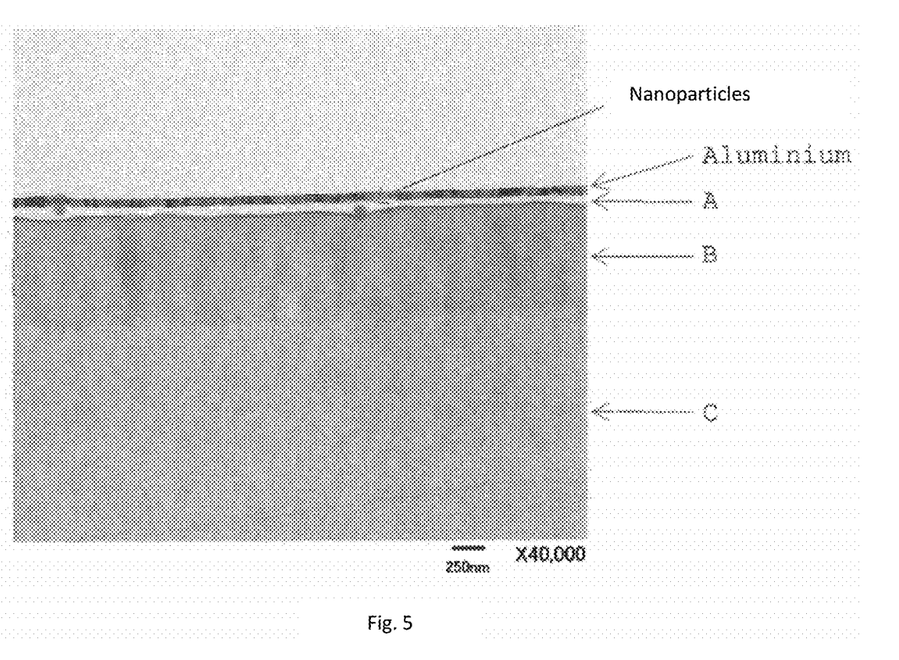
FIG. 5: Cross section through the film according to the invention in accordance with Example 2.

FIG. 5 is a cross section through the film according to the invention according to Example 2. The magnification is ×40,000. The dark, thin uppermost layer is the aluminium layer. The light layer below the aluminium layer is layer A. The two dark dots are nanoparticles. The thick, dark grey layer below is layer B. It is clearly visible that the nanoparticles are capable of increasing the surface roughness of the aluminium layer without leading to an opening in the layer. The nanoparticles therefore have no or very little negative effect on the barrier effect of the aluminium layer, but ensure the required surface roughness, which enables transport on rolls during processing and prevents interlocking when the film is wound and unwound.

The invention claimed is:

1. A polypropylene film comprising 4 layers (A) to (D), which are arranged in order from (A) to (D), wherein layers (B) to (D) comprise biaxially oriented polypropylene and wherein
   layer (A) contains polyurethane and nanoparticles and has a layer thickness of 25 to 300 nm,
   layer (B) further contains polymers with functional groups that are capable of forming covalent bonds with polyurethane and is directly connected to layer (A),
   layer (C) has at least a layer thickness of 50% of the total thickness of the film, and
   layer (D) represents an outer layer of the film and comprises an anti-blocking agent.

2. The polypropylene film according to claim 1, wherein layer (A) has a layer thickness in the range of 50 to 150 nm.

3. The polypropylene film according to claim 1, wherein layer (A) has nanoparticles of amorphous silicon dioxide.

4. The polypropylene film according to claim 1, wherein layer (A) has nanoparticles of which the average particle size is in the range of 20 to 150 nm.

5. The polypropylene film according to claim 1, wherein layer (A) contains 0.5 to 20% by weight nanoparticles.

6. The polypropylene film according to claim 1, wherein layer (B) comprises a maleic-acid-anhydride-modified polypropylene.

7. The polypropylene film according to claim 1, wherein layer (B) does not contain any anti-blocking agent.

8. The polypropylene film according to claim 1, further comprises a metal layer or metal oxide layer that is directly connected to the surface of layer (A).

9. The polypropylene film according to claim 1, wherein it has an aluminium oxide layer or silicon dioxide layer that is directly connected to the surface of layer (A).

10. A foodstuff packaging comprising a film according to claim 1.

11. A method for producing a film according to claim 1, comprising the steps of:
    providing a sheet that is monoaxially stretched in the longitudinal direction and comprises layers (B) to (D), wherein layers (B) to (D) comprise biaxially oriented polypropylene and wherein
    layer (A) contains polyurethane and nanoparticles and has a layer thickness of 25 to 300 nm,
    layer (B) further contains polymers with functional groups that are capable of forming covalent bonds with polyurethane and is directly connected to layer (A),
    layer (C) has at least a layer thickness of 50% of the total thickness of the film,
    layer (D) represents an outer layer of the film and comprises an anti-blocking agent, and wherein layers (B) and (D) are outer layers of the sheet,
        applying a layer of a liquid dispersion containing polyurethane and nanoparticles to layer (B),
        drying the liquid dispersion to produce layer (A),
        stretching the sheet in the transverse direction to produce a biaxially oriented film.

12. The method for producing a film according to claim 11, comprising the steps of:
    providing a sheet comprising layers (B) to (D) which are non-oriented and layers (B) and (D) are outer layers of the sheet,
    applying a liquid dispersion containing polyurethane and nanoparticles to layer (B),
    drying the liquid dispersion by heating to produce layer (A),
    simultaneously stretching the sheet in the longitudinal direction and transverse direction to produce a biaxially oriented film.

13. The method according to claim 11, wherein the surface of layer (B) is subjected to a corona treatment, before the liquid dispersion is applied.

14. The method according to claim 11, wherein the liquid dispersion is applied to layer (B) by reverse gravure kiss coating.

15. The method according to claim 11, wherein a wet layer formed by the liquid dispersion on layer (B) has a mass of 3 to 20 $g/m^2$ and particularly preferably 6 to 10 $g/m^2$.

16. The method according to claim 11, wherein the liquid dispersion is an aqueous dispersion.

17. The method according to claim 11, wherein the stretching ratio in the longitudinal direction is in the range of 2 to 8.

18. The method according to claim 11, wherein the stretching ratio in the transverse direction is in the range of 4 to 14.

* * * * *